United States Patent
Baentsch et al.

(10) Patent No.: US 9,639,690 B2
(45) Date of Patent: May 2, 2017

(54) USER TRUSTED DEVICE TO ATTEST TRUSTWORTHINESS OF INITIALIZATION FIRMWARE

(71) Applicant: International Business Machines Corporation, Armonk, NY (US)

(72) Inventors: Michael Baentsch, Rueschlikon (CH); Thomas Gschwind, Rueschlikon (CH); Andreas Schade, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/651,530

(22) PCT Filed: Nov. 26, 2013

(86) PCT No.: PCT/IB2013/060407
§ 371 (c)(1),
(2) Date: Jun. 11, 2015

(87) PCT Pub. No.: WO2014/091342
PCT Pub. Date: Jun. 19, 2014

(65) Prior Publication Data
US 2015/0317471 A1   Nov. 5, 2015

(30) Foreign Application Priority Data
Dec. 14, 2012   (GB) .................................. 1222582.7

(51) Int. Cl.
G06F 9/44   (2006.01)
G06F 21/44   (2013.01)
G06F 21/57   (2013.01)

(52) U.S. Cl.
CPC ............ *G06F 21/44* (2013.01); *G06F 9/4401* (2013.01); *G06F 9/4406* (2013.01); *G06F 21/572* (2013.01)

(58) Field of Classification Search
CPC ..................................................... G06F 9/4416
See application file for complete search history.

(56) References Cited

U.S. PATENT DOCUMENTS 7,318,150 B2    1/2008  Zimmer et al.
2003/0200428 A1* 10/2003  Chan ..................... G06F 9/4416
                                                  713/1

(Continued)

FOREIGN PATENT DOCUMENTS

CA         2 625 274 A1      6/2009
WO    WO 2008/085367 A1      7/2008

OTHER PUBLICATIONS

Search Report—PCT/IB2013/090407.

*Primary Examiner* — Josnel Jeudy
(74) *Attorney, Agent, or Firm* — Scully, Scott, Murphy & Presser, P.C.; David M. Quinn, Esq.

(57) ABSTRACT

The present invention is notably directed to a user trusted device (10), comprising: a connection interface (12) enabling connection (S2) with a computer (101); and a persistent memory (14) storing modules (15, 16, 17), which are configured, upon connection of the user trusted device (10) with said computer (101) via said connection interface (12), to: enable said computer (101) to start booting (S3, S3a) from the user trusted device (10); map (S6) firmware data to a code, the firmware data comprising program code of an initialization firmware and/or data accessible by the initialization firmware (122) of the computer while starting to boot; attest (S7-S12) trustworthiness of the code; and enable (S14) said computer (101) to complete booting from the user trusted device (10) if the code is attested. The present invention is further directed to related systems and methods.

16 Claims, 2 Drawing Sheets

(56) References Cited

U.S. PATENT DOCUMENTS

| | | | |
|---|---|---|---|
| 2008/0104382 A1* | 5/2008 | Tarkkala | G06F 21/305 |
| | | | 713/1 |
| 2008/0140921 A1* | 6/2008 | Sutardja | G06F 3/0611 |
| | | | 711/103 |
| 2008/0155524 A1* | 6/2008 | Shone | G06F 8/65 |
| | | | 717/168 |
| 2008/0165971 A1 | 7/2008 | de Cesare et al. | |
| 2008/0271163 A1 | 10/2008 | Stillerman et al. | |
| 2009/0158419 A1 | 6/2009 | Boyce | |
| 2009/0217373 A1 | 8/2009 | Stillerman et al. | |
| 2012/0011354 A1* | 1/2012 | Owen | G06F 9/4408 |
| | | | 713/2 |
| 2012/0084550 A1* | 4/2012 | Mizusawa | G06F 8/61 |
| | | | 713/2 |
| 2012/0266232 A1 | 10/2012 | Boyce | |
| 2012/0297177 A1 | 11/2012 | Ghosh et al. | |
| 2013/0081124 A1 | 3/2013 | de Cesare et al. | |
| 2014/0047541 A1 | 2/2014 | Boyce | |

* cited by examiner

USER TRUSTED DEVICE TO ATTEST TRUSTWORTHINESS OF INITIALIZATION FIRMWARE

CROSS-REFERENCE TO RELATED APPLICATIONS

This application is based on and claims the benefit of priority from commonly-owned, co-pending on PCT Application No. PCT/IB2013/060407 filed Nov. 26, 2013, which further claims the benefit of priority from commonly-owned United Kingdom Patent Application 1222582.7, filed on Dec. 14, 2012.

FIELD OF THE INVENTION

The invention relates in general to the field of user trusted devices enabling computers to boot therefrom, as well as related devices, systems and methods.

BACKGROUND OF THE INVENTION

A technology is needed, which would allow software to be executed on any non-previously prepared or reviewed computer (e.g., an employee's private PCs) while ensuring that its execution is secure, e.g., as secure as on a corporate/company PC. Such a technology would enable a trusted "bring your own" (BYO) computing work environment. BYO generally relates to "Bring your own device" (BYOD), "bring your own technology" (BYOT), or closely related, "bring your own behavior" (BYOB). BYOD or BYOT concerns corporate/business policy of how employees can bring and use personal mobile devices at work and access employers' email, databases and files, while otherwise using such devices at home, whereby personal applications/data are accessed though the same devices. Beyond hardware, BYOB extends this to software used on the device.

Today it is known that any software executed on a computer may be under attack by a number of viruses and malicious softwares (malware) that may be present on the PC's operating system. One solution for this problem is to restart a PC from an external boot media, e.g., stored on a user-trusted device, typically a secure device, and start a new and—from a security perspective—clean operating system (OS) from the external media.

However, this approach raises notably one significant technical drawback, as present inventors have realized, which the present invention aims at resolving.

Besides, external boot media are often provided on trusted devices (including secure, tamper proof devices), which type of devices is generally known. For example, for online transactions, a solution which has been developed is the so-called Zone Trusted Information Channel (or ZTIC for short). The ZTIC is a secure, non-programmable device for the authentication of transaction data. Since the ZTIC maintains a secured end-to-end network connection to the server, the ZTIC itself is tamper-proof against malicious software attacks and as it has its own input and output components independent of the host it connects to, the data shown on the ZTIC display is genuine. More details can be found in e.g., "The Zurich Trusted Information Channel—An Efficient Defence against Man-in-the-Middle and Malicious Software Attacks", by Thomas Weigold, Thorsten Kramp, Reto Hermann, Frank Höring, Peter Buhler, Michael Baentsch. In P. Lipp, A.-R. Sadeghi, and K.-M. Koch (Eds.): TRUST 2008, LNCS 4968, pp. 75-91, 2008. Springer-Verlag Berlin Heidelberg 2008.

BRIEF SUMMARY OF THE INVENTION

According to a first aspect, the present invention is embodied as a user trusted device, comprising:
 a connection interface enabling connection with a computer; and
 a persistent memory storing modules, which are configured, upon connection of the user trusted device with said computer via said connection interface, to:
  enable said computer to start booting from the user trusted device;
  map firmware data to a code, the firmware data comprising program code of an initialization firmware and/or data accessible by the initialization firmware of the computer while starting to boot;
  attest trustworthiness of the code; and
  enable said computer to complete booting from the user trusted device if the code is attested.

In embodiments, said modules comprise: a bootloader enabling said computer to start booting from the device; a data mapping module, executable at the computer to map said data; and a verification module configured to attest trustworthiness of the code, wherein the bootloader is detectable by the initialization firmware upon connection of the user trusted device with said computer and comprises instructions for the firmware to initiate a transfer of said data mapping module onto the computer for subsequent execution at the computer.

Preferably, the data mapping module is further configured, upon execution at the computer, to transfer said code to the verification module after mapping; the verification module is executable at the device and/or the computer and configured, upon execution, to attest trustworthiness of a code transferred by the data mapping module; and the bootloader is further configured to interact with the firmware to complete booting from the user trusted device upon receiving confirmation that a code is attested from the verification module.

In preferred embodiments, the verification module is configured to instruct, upon execution, to attest trustworthiness of the code by checking it against a list of codes attesting good states of the initialization firmware, which list of codes is preferably stored on the device.

Preferably, the verification module is further configured to instruct to connect to a server, preferably via said computer, for checking the code at least partly at the server.

In embodiments, the verification module is further configured to interact with said firmware of the computer to subsequently interact with a network card of the computer, in order to initiate a communication over the network as enabled by said network card, to connect to the server.

Preferably, the verification module is further configured to access network card drivers stored on the user trusted device to directly interact with a network card of the computer, in order to initiate a communication over the network as enabled by said network card, to connect to the server.

In preferred embodiments, the verification module is further configured to: interact with the bootloader to enable said computer to continue booting from the user trusted device, such as to boot an operating system of the computer, which is capable of initiating a communication over the network to connect to the server; and complete booting from the user trusted device if the code is attested.

According to another aspect, the invention is embodied as a method for enabling a computer to boot from a user trusted device, the user trusted device comprising a connection interface enabling connection with said computer, the method comprising:

enabling said computer to start booting from the user trusted device upon connection of the user trusted device with said computer via said connection interface;

mapping firmware data to a code, the firmware data comprising program code of an initialization firmware and/or data accessible by the initialization firmware of the computer while starting to boot;

attesting trustworthiness of the code; and enabling said computer to complete booting from the user trusted device if the code is attested.

In embodiments, the method further comprises interacting with an initialization firmware of the computer, upon connection of the user trusted device with said computer, to: enable said computer to start booting from the user trusted device; and initiate a transfer of a data mapping module onto the computer for subsequent execution at the computer, to map said firmware data to said code.

Preferably, attesting trustworthiness of the code comprises: instructing to attest trustworthiness of the code by checking it against a list of codes attesting good states of the initialization firmware, which list of codes is preferably accessed from a server.

In preferred embodiments, attesting trustworthiness of the code comprises: connecting to a server via said computer for checking the code at least partly at the server.

Preferably, connecting to a server further comprises: interacting with said firmware of the computer to subsequently interact with a network card of the computer, in order to initiate a communication over the network as enabled by said network card, to connect to the server.

In variants, connecting to a server comprises: accessing network card drivers stored on the user trusted device to directly interact with a network card of the computer, in order to initiate a communication over the network as enabled by said network card, to connect to the server.

In other variants, connecting to a server comprises: interacting with the initialization firmware to start booting an operating system of the computer, to initiate a communication over the network through the operating system and thereby connect to the server, and to complete booting from the user trusted device if the code is attested.

According to a final aspect, the invention is embodied as a computer program product for enabling a computer to boot from a user trusted device, the computer program product comprising a computer-readable storage medium having modules embodied therewith, the modules allowing for performing all the steps of a method according to any of the above embodiments.

Devices, systems and methods embodying the present invention will now be described, by way of non-limiting examples, and in reference to the accompanying drawings.

DETAILED DESCRIPTION OF THE INVENTION

The following description is structured as follows. First, general embodiments and high-level variants are described (sect. 1). The next section addresses more specific embodiments and technical implementation details (sect. 2).

1. General Embodiments and High-Level Variants

Figure 1:
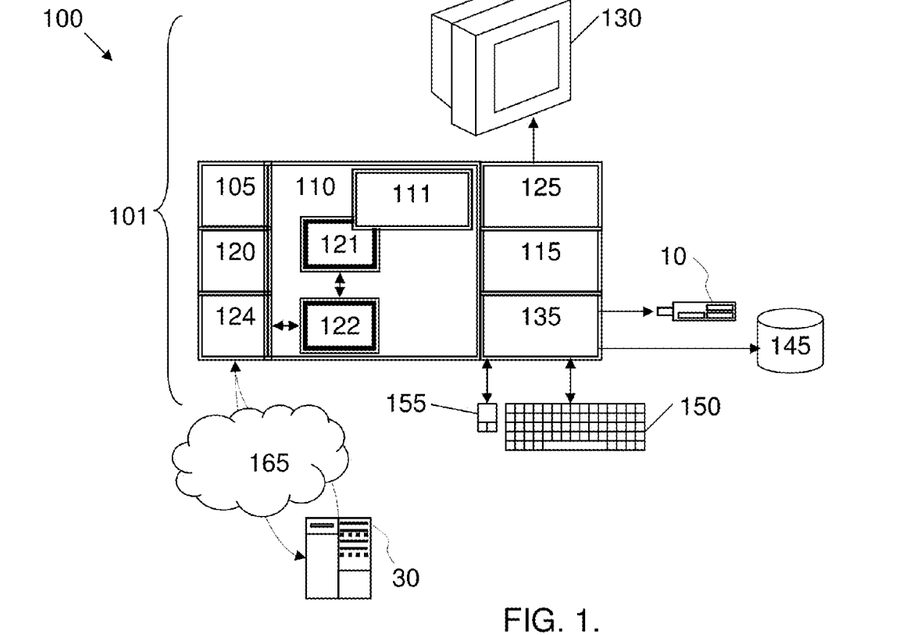
FIG. 1 schematically represents a general computerized system, suited for implementing method steps as involved in embodiments of the invention.

FIG. 1 represents a general computerized system, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

One of these devices is a user trusted device 10, discussed below in detail.

The processor 105 is a hardware device for executing software, particularly, software that is stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105. In particular, memory 110 shall include a given memory portion 121 to which a data mapping module 15 (and possibly a verification module 17) can be transferred for subsequent execution.

The software in memory 110 may include one or more separate programs, each of which comprises a listing of executable instructions for implementing logical functions, notably functions involved in embodiments of this invention. In the example of FIG. 1, memory 110 may be loaded with instructions for enabling the computer 101 to start and complete booting from the user trusted device 10, if some conditions are verified.

The software in memory 110 may include a suitable operating system (OS), even if the novel methods discussed here operate at least partly "before" any OS is fully loaded at the host 101 (at least some of the steps operate at another level, closer to hardware, whereby the normal behavior of the computer 101 is impacted). Once (and if) loaded, an OS 111 shall essentially control the execution of other computer programs, and provide scheduling, input-output control, file and data management, memory management, and communication control and related services.

Note that the OS to be loaded is preferably not initially stored on the computer's hard disk drive. This might notably be the case in such scenarios where a private computer is to be started without using any of the owner's private data stored thereon. Yet, in some situations, it may be useful to cache an OS started by the trusted device in a separate area on the computers hard disk. In the preferred embodiments described below, the OS to be loaded is initially contained in the user device 10, loaded through the network, or cached on the computer's hard drive. In the latter case; a signature of the OS is typically verified.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 10 and/or the host 101. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware 122, and with the device's CPU 11, as needed.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup. It is otherwise generally able to start an OS, and support the transfer of data among the hardware devices. The BIOS is typically stored in ROM so that the BIOS can be executed when the computer 101 is activated.

For the purpose of implementing methods as described herein, the BIOS 122 can be used (interacted with) notably to map firmware data to a code and possibly to initiate a communication over a network. More generally though, any suitable firmware 122 or interface to a firmware (i.e., a combination of persistent memory and program code and data stored therein, which operates "below" any OS 111 in the software stack), can be used to that aim. This typically is the BIOS. However, examples of suitable firmwares 122 or interface thereto include a Preboot eXecution Environment (PXE) BIOS, the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, most UEFI images have legacy support for BIOS services. More generally, any firmware having legacy support for BIOS services or comparable services can be contemplated for the purpose of implementing methods described herein. Even more generally, any initialization firmware operating below the operating system in the software stack may potentially convene for the purpose of implementing the present invention.

When the computer 101 is in operation, the processor 105 is configured to execute software stored within the memory 110, to communicate data to and from the memory 110, and to generally control operations of the computer 101 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely firmware and/or software embodiment (firmware, resident software, micro-code, etc.) or an embodiment combining firmware/software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, or partly on the user's computer (as a stand-alone software package), or still partly on two or more of the following: the user's computer 101, the user trusted device 10, and a remote computer 30. The host computer and the server may be connected through any type of network, including: local area network (LAN); wide area network (WAN); connection to an external computer (Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring generally to FIGS. 1 to 4, an aspect of the invention is first described, which concerns a secure device 10 (or more generally a user trusted device). This device is a corporate or personal device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 100 g, preferably less than 60 g and more preferably less than 40 g. Additional aspects of this device 10 that may contribute to make it "secure" shall be discussed later.

At least, this device comprises: a connection interface 12 enabling connection S2 with a computer 101; and a persistent memory 14, which notably stores modules 15, 16, 17.

The latter are configured to execute a number of operations, jointly with computer 101, upon connection of the device 10 with computer 101 via said interface 12. Be they described in respect of the device 10 or methods according to embodiments of the invention, such operations consist, on a high level, of:

1. Enabling computer 101 to start booting from the device 10 (steps S3, S3a);
2. Mapping "firmware data", i.e., data which comprises program code of the initialization firmware of computer 101 122 and/or data accessible by said initialization firmware while starting to boot, to a code (step S6). The latter code is a "mapping" code, i.e., to be distinguished from the program code of the firmware (the mapping code may simply be referred to as "code" in the following);
3. Attesting trustworthiness of this (mapping) code (steps S7-S12); and
4. Enabling computer 101 to complete booting from the device 10 if the mapping code is attested (step S14).

Computer 101 is typically a personal computer (PC), preferably a PC for mobile use, notebook or netbook, or a PDA or a smartphone. It is referred to herein as (host) computer or PC, for simplicity.

As touched earlier, restarting such a computer from an external boot media and start a "clean" OS ("clean" from a security perspective) from the external media, or an otherwise trusted OS, is one way of solving the problem that any software executed on a PC may be under attack by a number of viruses and malicious software malware that may be present on the PC's operating system.

However, as present inventors have realized, this approach notably raises the following question: Can one trust the BIOS, and more generally any initialization firmware 122 involved at the PC's startup? Indeed, other initialization firmware can or could be prompted to execute while starting the computer, which could be infected as well. To solve this issue, the above method allows for attesting trustworthiness of such firmware, by obtaining data that comprise program code of the initialization firmware and/or data accessible by the initialization firmware while starting to boot and subsequently checking such data (hereafter referred to as "firmware data"). The computer shall complete the boot from the external boot medium only if the firmware data are attested. In other words, one key element of this approach is that it requires a PC-external trust anchor that is, by definition, much less accessible by a malware or an attacker than a usual PC, PDA, etc. Another key element is to collect critical information about the PC, at the right moment, i.e., before the OS is started (or at least fully started), and reporting it to a trustworthy analysis, e.g., via a secured channel and finally, making a decision as to whether to start execution of the clean OS.

There are several possible variants as to what critical information, i.e., what firmware data to use. Using the program code (i.e., data capturing the program code of the firmware or only part thereof) itself is already satisfactory inasmuch as it prevents an attacker to change the firmware's program code. Independently from the firmware's program code itself, using data accessible by the initialization firmware, such as configuration data for the initialization firmware, is also advantageous as, indeed, the configuration data (only) could be tampered with. Thus, ideally, both the firmware's program code of the initialization firmware and data accessible by the initialization firmware are used.

Concerning firmware data: we can for instance use a hash value that is computed over a ROM or a CMOS ROM dedicated to or accessible by the firmware 122 (hence comprising both the firmware's program code and configuration data) while starting, as well as any other key identification strings. Such data characterize the firmware as such (the firmware's program code) as well as the state of the firmware and therefore provides a sound basis as to whether said initialization firmware is compromised.

Also, mapping such data to a single code enables a quick checking and thus a quick attestation. One may for instance use a hash value computed over the BIOS's ROM, the BIOS's CMOS ROM, and/or other key BIOS identification strings. More generally, any algorithm/subroutine that is capable of mapping a firmware dataset to a code, preferably of a fixed length, such as a single integer, may be used for facilitating the subsequent check. While using a hash function appears more appropriate in many respects, a simple checksum could be relied upon. Now, depending on the security level desired, one may nonetheless prefer using fingerprints i.e., high-performance hash functions to uniquely identify substantial datasets, cryptographic hash functions or, still, randomization functions.

Figure 3:
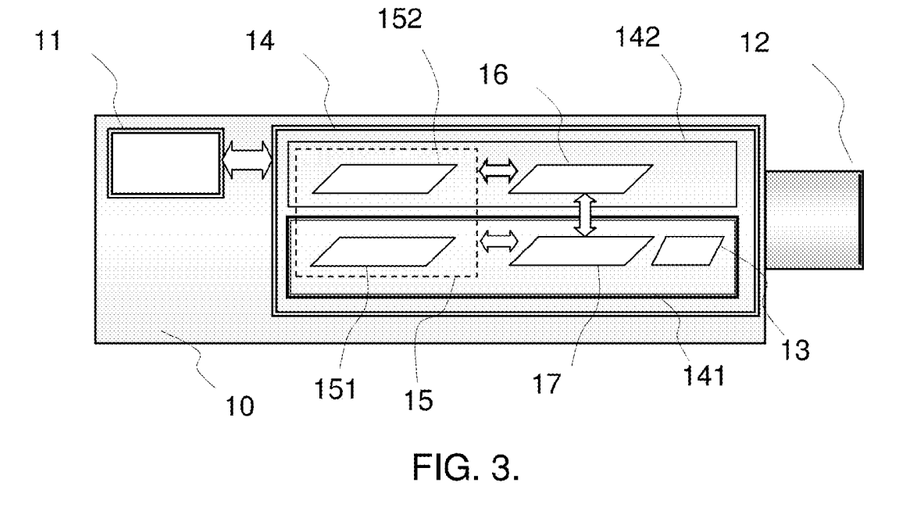
FIG. 3 is a simplified representation of selected components of a secure device according to embodiments, and how these components interrelate functionally.

One practical way of embodying the above method is to provide the trusted device 10 with different, possibly interactive, modules, performing respective tasks or having respective functions. Referring to FIG. 3, said modules 15, 16, 17 may for instance be decomposed into:

- a bootloader 16, i.e., boot enabling instructions (or data structure), which enable computer 101 to start booting from the trusted device 10;
- a data mapping module 15, executable at the computer 101 to map said data; and
- a verification module 17, designed to attest trustworthiness of any mapped code.

Figure 2:
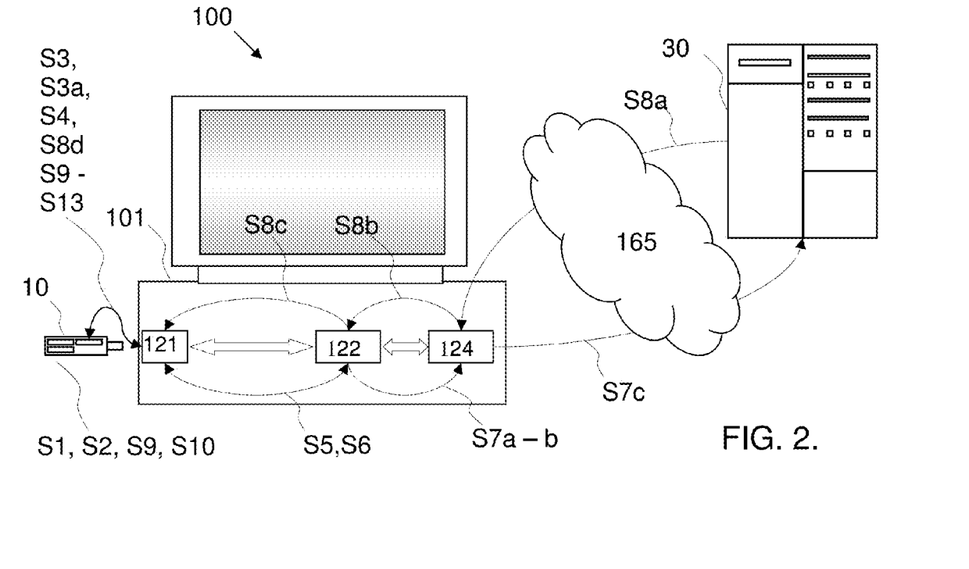
FIG. 2 schematically illustrates selected components of the computerized system of FIG. 1, together with a flowchart illustrating steps of a method according to embodiments.
Figure 4:
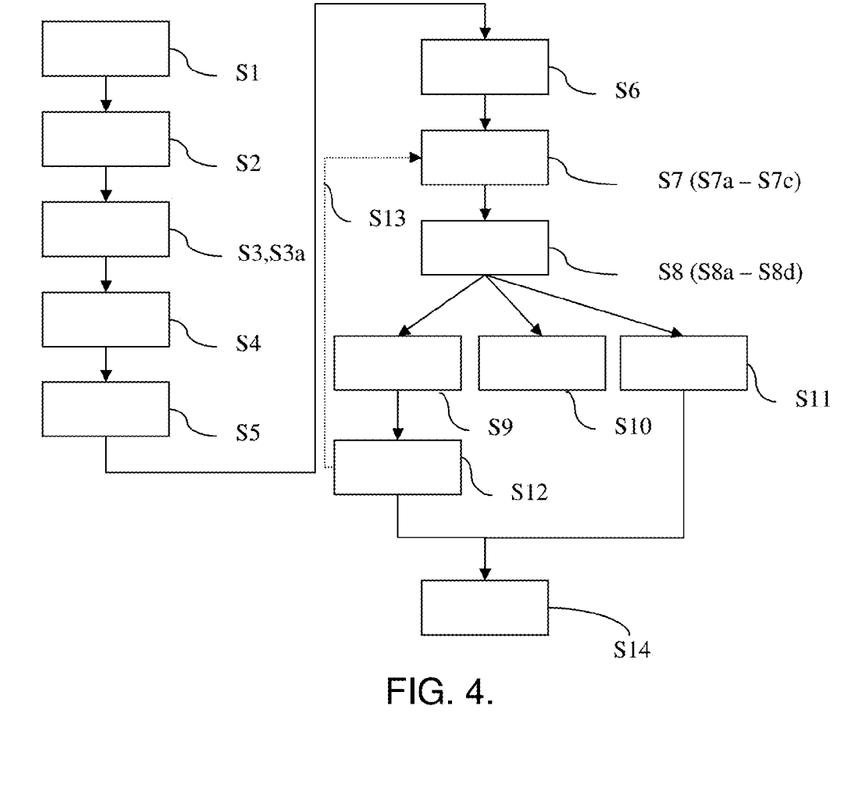
FIG. 4 is a flowchart illustrating high-level steps of a method for enabling a computer to securely boot from a user trusted device, according to embodiments.

In such embodiments, the bootloader 16 is detectable by the initialization firmware 122 upon connection of the device 10 with computer 101 (steps S3, S3a in FIG. 2 or 4). It comprises instructions for the firmware 122 to initiate (step S4) a transfer of said data mapping module 15 on computer 101, e.g., on a given memory portion 121 for subsequent execution (steps S5-S6) at the computer 101. In practice, the data mapping module 15 and verification module 17 are, each, a small program, which may for instance be stored as part of the trusted device's firmware.

Having the data mapping module 15 executing upon the computer 101 starting substantially lowers the risk of tamper, i.e., the genuine data mapping module 15 is deputed in situ (as soon as possible) to control operations of obtaining, i.e., accessing the firmware data (step S5) and mapping them (step S6) to a code. This makes it harder for an attacker, malware, etc., to substitute a genuine mapping code.

Still in reference to embodiments of FIGS. 2 and 4, the data mapping module 15 is further configured, upon execution at the computer 101, to transfer said code to the verification module 17, after mapping. The verification module shall, upon execution, attest trustworthiness of the code transferred by the data mapping module 15, through a series of steps S7-S12, which may involve an external entity 30 contacted via device 10 or computer 101, in embodiments. In that respect, the verification module 17 is executable at the device 10, or at the computer 101, or partly at the device 10 and partly at the computer 101. Lower latency can be expected if the verification module 17 is transferred and executed at the computer 101 as well, especially if an external entity 30 has to be involved in the attestation process. Yet, such a solution would be easier to attack. Thus a compromise needs be found: on the one hand, as little as possible should be executed on the host computer for security reasons. On the other hand, execution at the computer results in lower latency. A panel of (intermediate) solutions can therefore be designed, depending on the context, the applications contemplated, associated risks, design constraints, etc.

In all cases, like the data mapping module 15, the verification module 17 may interact with the initialization firmware 122 (e.g., the BIOS), or another firmware, to perform part or all of its functions.

The bootloader 16 may likewise interact with the firmware 122, notably to instruct to complete the boot of computer 101 from the trusted device 10, upon receiving confirmation from the verification module 17 that the code is a valid code. The firmware 122 may further interact with the bootloader and/or the data mapping module to load more of the bootloader/DMM before attesting the computer's security. Examples of instructions that may be used by the modules 15-17 to interact with a firmware 122 shall be given later.

For example, the verification module 17 may proceed or instruct to attest trustworthiness of the code by checking it against a list of codes attesting good states of the initialization firmware 122 (call it a "white list"). The white list of codes could be directly stored on the device 10, which allows the verification module to check if a mapped code is contained in this list, while executing on the device 10. However, such a solution is not the most practical when the list of "good states" needs frequent updates.

Therefore, alternatively, modules of the device 10 may connect to an external entity 30, e.g., a server, to check whether the mapping code is a valid code. For example, the verification module 17 may be configured to instruct to connect to server 30, preferably via computer 101. Now, connecting to server 30 can be implemented in several ways. Most advantageous is to connect to the server 30 via the computer 101, with or without the help of the OS, as to be discussed now. In preferred embodiments, the data sent to the server is encrypted on the device 10 and the data received from the server 30 is decrypted by the device 10. This ensures end-end security of the communication channel.

For example, as depicted in FIG. 2, the verification module 17 may interact with the firmware 122 (steps S5-S6), to subsequently interact with a network card 124 (steps S7a-b) of computer 101, this, in order to initiate (step S7c) a communication over the network 165, as enabled by the network card 124, such that the server 30 can be contacted. Thus, in that case, the verification module 17 relies on the host computer's firmware to enable a communication with the external entity, such that the device needs no built-in network cards or network enabling devices, nor it needs to store drivers for the network card 124 of the host 101.

The result of the analysis is communicated back to the verification module 17, though a series of steps S8a-d. The verification module can then communicate the results of the analysis to one or more of the other modules 15, 16. In that case, at least part, if not all of the code analysis is deferred to the server, although additional communication steps may be involved between the module(s) and the server, as to be discussed later. Such additional communication steps would, technically, be essentially similar to steps S5-S6-S7-S8.

The result of the analysis performed at the server 30 are preferably transferred as follows:
steps S8a: from the server 30 to the network access device 124 of the PC 101 or of the device 10, if any;
Then, step S8b, from the network access device to the firmware 122 and from the firmware 122 to the requesting module 15, 16, 17, while executing on memory 121 (step S8c) or on the device 10 (step S8c); or
directly from the network access device to the requesting module 15, 16, 17 (not shown).

In addition, note that, notwithstanding the diagram of FIG. 2, the path taken by the data sent from the server 30 (steps S8a-d) can be exactly reversed to the path taken to initiate the communication with the server 30 (steps S3-S7), or not. In particular, the data sent back may be buffered in another portion of memory than portion 121, before being passed to the secure device 10, if necessary.

Next, upon receiving the result of the analysis, the verification module 17 interprets the results (step S9-S11), and, depending on whether the code is valid or not, instructs to complete the booting of the PC 101.

Step S10, if the code is invalid, the boot is interrupted, no additional data, key, etc. is passed to the PC to complete the boot;

Step S11, if the code is valid, the boot is completed: all necessary data are passed to the PC to that aim.

The actual contents of the results of the analysis transferred to the module may reduce to a minimal amount of information, e.g., a single bit, informing that the code is valid or invalid.

In variants, information returned by the server may ascertain that:
(i) the code is listed in the white list (e.g., "1" is returned, while "0" means that the code is not in the white list); or
(ii) the code is listed in a black list (e.g., "1" is returned, while "0" means that the code is not in the black list).

Depending on the model and the outcome, additional queries/interactions might be needed to determine whether the boot should be completed. For example, in case (i) above, returning a "0" may not necessarily mean that the boot should be aborted. Similarly, in case (ii) above, returning a "0" may not necessarily mean that the boot should be completed. Thus, intermediate situations may be provided, e.g., a grey list, which, as evaluated by the verification module 17 on step S9, needs additional information to be compounded (step S12), possibly additional interactions (step S13) with the server 30, to arrive at a decision as to whether to complete the boot. If the eventual outcome confirms validity of the code, the boot is completed, step S14. More shall be said in the next section as to the additional steps S12-S13.

Now, instead of using the firmware 122 to initialize the network card 124, the verification module 17 may, in variants, access network card drivers stored on the trusted device 10 to directly interact with the network card 124, whereby an external entity 30 could be contacted as well. In that case, however, suitable network card drivers need to be stored, and possibly updated, in the trusted device 10.

Therefore, it may be simpler to contact the server 30 via the OS of the host 101, at least partly loaded for this purpose. Namely, the verification module 17 may interact, preferably via the bootloader, with the firmware 122 to partly run an OS 111 at the computer 101.

Preferably, the OS 111 is not entirely loaded. Instead, components of the OS that are necessary to be able to connect to the server 30 are loaded, and preferably only those components are loaded (preferably from the device 10). Thus, computer 101 partly boot from the trusted device 10, such as to boot the OS only to the extent needed to initiate a communication over the network 165 to connect to the server 30 and collect results returned from the server. Then, if the code turns out to be a valid code, as per the analysis results returned from the server 30, the booting operation completes, whereby the OS can be fully loaded.

In variants, the OS may be fully loaded but the applications may not be made available by the user device 10. In other variants even the applications could be made available; however, keys necessary to sign any requests performed with such applications would be made available only after trustworthiness has been attested by the verification module 17.

Note that, although the OS is partly or fully loaded in the above variants, it remains that the firmware data have been captured beforehand, such that a subsequent verification of the mapped code remains meaningful. Yet, it can be realized that the more interactions with the computer 101 are needed to validate the code, the higher the risk of tampering with these interactions.

Therefore, as a "radical" alternative, one may prefer to have the device 10 equipped with network access means, e.g., with a network device (wired or wireless), such as to connect directly to a server. In that case, the verification module essentially executes at the device, to instruct to check mapping codes returned by the mapping module, the core of the analysis being performed by the server. Such a solution is somewhat more expensive. However, latency is reduced since no additional interactions with the computer 101 is needed to contact the server.

The bootloader is detectable by the firmware 122 upon connection (step S2 in FIG. 2 or 4) of the secure device 10 with said host computer 101. The bootloader is designed such that computer 101 can boot from the secure device 10, upon restarting. This functionality can for instance be provided as per the data structure of the bootloader itself (conveniently stored on the device 10), as known per se. The boot loader 16 may also comprise instructions for the firmware 122 to initiate a transfer of additional modules, such as a network updater, on the host computer 101 for subsequent execution at the host computer 101, along other modules 15, 17.

In this respect, "transfer" in the present context means that the firmware 122 takes steps to store the module(s) 15-17 (or any additional module such as a network updater) on a suitable host computer's memory portion 121, e.g., this preferably occurs when one or more (e.g., a few) first blocks of the module(s) are being read by the computer 101.

Thus, the boot loader 16 is detectable by the firmware (BIOS) 122 upon connection of the device 10 to the host 101, whereby the host can boot from the secure device 10. The boot loader 16 comprises instructions for the firmware 122 to initiate a transfer of one or more of the modules 15-17 on the host 101 for subsequent execution at the host computer 101, upon booting. When executing at the host 101, the modules 15-17 interacts with the firmware (BIOS) 122 to initiate the code mapping operations, as well as the verification if needed.

In addition, interactions between an additional module such as a network updater and the firmware (BIOS) 122 may take place to initiate an update of the device. This update may concern a list of known good states' codes, network card drivers, or still, even the firmware of the trusted device 10. Such a solution makes the device 10 easily updatable from the network, even if the device 10 is not equipped with a network card or more generally has no direct network access. This solution enables extremely simple update processes e.g., insert the device 10 into a computer 101, restart, choose the new functionality. No special hardware/software/knowledge is required to reconfigure the device. The hardware can always stay the same. As touched earlier, the device 10 is preferably not equipped with direct network access means, a thing that allows for simpler and cheaper designs for this device 10. No specific software/OS is furthermore required on the host 101 for performing this update, beyond the firmware 122.

Communication(s) with an external entity may be carried out by means of:

An HTTP connection from server to device 10 through computer 101;
End-end authentication; and
Signature and other encryption data 13, if needed, can be stored on a secure memory 141 of the device 10.

Next, referring back to FIG. 3, the persistent memory 14 shall preferably comprise:

a secure memory 141, onto which is stored a first part 151 (or given portions) of the data mapping module 15 (and/or the verification module 17); and
a non-secure memory 142, e.g., a SD card, onto which is stored a second part 152 (or other portions) of the module(s) 15, 17.

The presence of a secure memory makes the user trusted device a secure device. For example, a part of the module 15 may reside encrypted on the non-secure memory 142, while a corresponding encryption key is stored on the secure memory 141. The secure memory is typically limited to 128 ko or 256 ko, for cost reasons. It can thus preferably be used to merely store encryption data, e.g., hashes/signatures 13. Part 151 of a module can therefore reside on the secure memory 141 while other parts 152 of the module may reside encrypted on the non-secure memory. Similarly, the bootloader 16 can reside on a SD card, yet encrypted with signature residing on the secure memory 141. When computer 101 requests a given block or any data chunk of the bootloader, then the device's CPU 11 shall be prompted by software residing in memory 14 to decrypt the requested block, e.g., using encryption data stored on the secure memory 141.

Preferably, the portion(s) of the module(s) 15-17 that reside on the secure memory shall occupy less than half a size of the secure memory, owing to memory constraints. Ideally though, all parts of the modules shall occupy as little memory as possible. For instance, some implementations of the modules have been successfully tested which use less then 4 ko for each part of each module, without contacting a remote server and less then 64 ko with network functionality in case a remote server is contacted. Those skilled in the arts will appreciate that the code implementing the functionality to contact a remote server can be shared along multiple modules stored on the user trusted device 10.

The connection interface 12 of the device 10 may for instance be of the following type:

Universal Serial Bus or USB;
External Small Computer System Interface or SCSI;
External Serial Advanced Technology Attachment or SATA;
Firewire; or
Thunderbolt.

More generally though, this could be any current or future connector (be it wired or wireless) that allows the computer to boot from the external device 10. In addition, the same interface 12 can furthermore allow the user trusted device 10 for communicating with any external device such as a beamer, a printer, or any other output device.

As usual, the user trusted device 10 may be provided with processing means (or computing means, i.e., CPU) 11, such as a crypto Processor, coupled to a memory, which more generally comprises a persistent memory 14 and, preferably, a non-persistent memory too (not explicitly shown but the non-persistent memory can be considered to be part of the processing means 11).

In the present context, the persistent memory notably stores computerized methods, e.g., modules 15-17 evoked above, to be executed by the processing means 11. Of course, the various modules 15-17 evoked herein could be considered as a one and a same (super) module provided with different functions, and able to execute at the computer 101, or partly at the computer 101 and at the device 10.

If necessary, the secure device has a card reader to read user credentials stored on a memory card, e.g., the non-secure memory 142 or any smart card. Suitable use can safely be made out of such data, e.g., user credentials as stored on the card. In particular, a trustworthy connection can be established between a user (or strictly speaking the device 10) and a third party, e.g., server 30, via the host 101 and using such data. In a variant, the user credentials may be stored directly on the secure device. Further interfaces (like control buttons and display) may be provided to allow for interaction with the user.

The above embodiments have been succinctly described in reference to the accompanying drawings and may accommodate a number of variants. Several combinations of the above features may be contemplated. Examples are given in the next section.

2. Specific Embodiments/Technical Implementation Details

Specific embodiments are now discussed, which combine several optional features discussed in the previous section. These embodiments are again described merely in reference to FIG. 2 or 4, in section 2.1. In addition, and complementary to whether the PC's firmware 122 has been tampered, novel methods that allows to identify whether software is executed in a virtualized environment on computer 101 are discussed in section 2.2. Typical examples of instructions that can be used in embodiments are given in sect. 2.3.

2.1 Detecting a BIOS that has been Tampered with

In this section, the external piece of hardware is configured to help establishing whether the firmware 122 (now on assumed to be a BIOS, to fix ideas) is trustworthy or not.

Process Steps (FIGS. 2, 4):
1. Compute a hardware fingerprint of the BIOS (steps S5-S6): For instance, we can use a hash value that is computed over the BIOS's ROM, the BIOS's CMOS ROM, as well as other key BIOS identification strings, as mentioned earlier.
2. The external device 10 compares the fingerprint obtained with a previously computed hardware fingerprint (steps S7-S12) and accordingly determines whether startup of the software may proceed (step S14). If an incorrect BIOS has been detected, the device notifies the user and stops working.
3. If the fingerprint is correct, the device continues to operate such as allows the PC to retrieve more software components (possibly stored on the device) or gives out encryption keys or other authentication tokens to the software to be executed including a complete, clean OS as mentioned in the previous section, whereby the PC can complete the boot, step S14.

Multiple variants to item 2 above are possible. First, a list of trustworthy BIOSes may be needed to perform a comparison. This can be accomplished as follows, when a non-previously known hardware fingerprint is detected (not in the white list), step S9, the user may be asked additional questions as to possible reasons for a change of hardware fingerprint, e.g., whether she has bought a new PC or installed a BIOS update (both approaches would be a reason for the presence of a new fingerprint). If so the user can confirm, e.g., via a user interface of the device 10 or a BIOS-like interface, step S12 and the new fingerprint is added to the white list of devices, subject to later confirmation, if necessary. If not, the fingerprint could be added to a black list. Indeed, the PC may have been changed without the user being aware of this in that latter case.

Adding a new fingerprint to the white or the black list is preferably carried out by accordingly informing the server 30, step S13. Communications with the server 30 may be achieved through the Transport Layer Security (TLS) (or its predecessor, Secure Sockets Layer (SSL)) cryptographic protocols, as described in the paper "The Zurich Trusted Information Channel—An Efficient Defence against Man-in-the-Middle and Malicious Software Attacks", cited in introduction.

As evoked several times, the operations of verifications can be locally performed (at the device 10 and/or at the PC 101), or at the server 30. The ratio of non-local to local verification operations may vary from an implementation to another, possibly dynamically, depending on the context, design constraints or, still, external constraints, e.g., the availability of updates, etc. Many possible hybrid solutions can be contemplated. For instance, in an environment where the judgment about the correct security properties of the BIOS of the end user cannot be trusted, the user decision could—but should preferably not—be taken into consideration. If the user choice is not taken into consideration, the white list stored on the user trusted device, may be used, or a possibly updated white list stored on a server may be used, as the final decision. Yet, variants may assign weights to each option and base the decision of some kind of accumulation of the individual options.

Interestingly, the present approach enables the property of locking the device to specific BIOSes and hence to specific PCs, if desired. The list of good fingerprints may be stored in a central database for all users, giving the advantage that a BIOS once determined as good is automatically available to all users. Alternatively the white list may be maintained on a per user basis, or category thereof. The black list should preferably be central to all users, or categories thereof.

This approach proposed here requires software to be executed on the reviewed PC. Thus, it can be argued that it can be attacked by a modified BIOS—by definition running before the proposed BIOS-checking data mapping module 15—as well. Hence, the present approach is only a heuristic as to whether the BIOS has been attacked. However, it makes such an attack much more difficult. Without the present methods, an attacker only has to create a suitable replacement BIOS. With the present methods, the attacker has to perform the following additional steps:

Create a replacement BIOS with the same key characteristics as the BIOS she is going to replace;
Creating such a BIOS requires the attacker to know the desired BIOS upfront, to seamlessly replace it;
Creating such a BIOS further requires the attacker to anticipate the presence of the secure device as well as the internal algorithm it uses for creating the fingerprint.

In this respect, the methods proposed herein may employ different algorithms for computing the BIOS fingerprints. Different approaches may be used to change the algorithm. Such as, have a pre-determined set from which the algorithm is chosen by random. Require devices to be updated regularly with a different algorithm, to reduce the time window for creating an attack, etc.

2.2 Detecting Execution within a Virtual Machine

Complementarily to aspects discussed so far, there also is a need for computerized methods for user trusted devices, which could help to determine whether the clean OS is executed within a virtual machine.

Indeed, as mentioned in introduction, when restarting a PC from an external boot media and starting a new and clean OS from the external media, another question that raises is, as present inventors have realized too: Is it indeed the authentic user who restarted the PC? Or is a malicious virtualized environment started to tamper with the clean OS newly started. Also, it might be possible that security-unaware and/or convenience-preferring users try to utilize such concept to get around restarting the PC.

Identifying whether the system provided by means of the user trusted device is to be executed within a virtualized environment is advantageous, for the following reasons:

A modified BIOS may pretend to the user trusted device to be booted normally from the host computer while in fact the computer is virtualized, i.e., the virtualized computer would present to the user trusted device like the real computer but would modify certain computer instructions to be able to modify the system to be started using the user trusted device whenever the virtualization layer deems fit.

The user may try to boot the system provided on the user trusted device in a virtualized environment. Reasons for doing this may be to not have to reboot the private computer and keep the private programs already started. I.e., to not have to restart his private programs once the corporate work is done. However, by doing so, the user would expose the system from the user trusted device to the same risks as above. I.e., the system would be exposed to any malware present on the computer that realizes that sensitive computations are carried out as part of the virtual machine execution.

These two items make it desirable for the user trusted device to be able to identify whether the computer presented to the user trusted device is real or virtualized. In the present context, one may want to be able to identify whether software is executed in a virtualized environment, in addition to whether the BIOS has been tampered.

A solution developed by the present inventors relies, once more, on the user trusted device 10. Upon or after connection of the device with the computer (and upon restarting the computer, the following additional operations can be performed, which essentially consist, on a high level, in:

1. Enabling the computer 101 to start booting from the user trusted device 10;
2. Instructing the processor 105 to execute some reference code;
   Note that the code is preferably provided by the device 10 itself, e.g., by a processor instruction module. In variants, an identifier or still an address of the code could be passed to the processor 105. This code typically include several instructions, which may depend on the machine tested;
   This code is chosen so as to be sensitive to a virtualized environment and is therefore referred to as a "virtualization sensitive code". Namely, this code executes differently and gives rise to different execution characteristics depending on whether it is executed in a virtualized environment or natively. The execution characteristics can notably differ in:
   A result that is produced from the execution; and/or the computational effort needed, measurable by way of timing characteristics, processor cycles, etc. (second class of embodiments).
   For instance, a computation that of special interest for x86 based PCs would be to switch between real mode and protected mode (More generally, any other instruction that has different resource characteristics when executed natively than in a virtualized environment can be contemplated).
   As per instruction to the processor, execution of the virtualization sensitive code occurs while computer 101 starts booting, i.e., after the boot process has began and before it completes, i.e., before major/critical components of the OS are loaded.
   The processor 105 is further instructed to issue some completion data (e.g., a result, a timestamp, or a timestampable event, etc.) upon completion of the execution;
3. The next set of operations is to determine, based on the completion data, whether the execution was not performed in a virtualized environment (or, equivalently, whether the execution was performed in a safe environment, e.g., natively); and
4. Finally, if it is determined that the execution was not performed in a virtualized environment, the computer 101 can be enabled to complete booting from the device 10. In embodiments, this additional condition is indirectly ascertained, e.g., user-interactivity might be needed. Also, this additional condition is not a sufficient condition, as other conditions may be involved, as discussed notably in section 2.1 above (e.g., the BIOS is tested as well).
   If it is determined that the execution was not performed in a virtualized environment, the boot process can be continued, e.g., more data, key, software, boot image, etc. can be provided to the computer 101 to that aim.
   If, on the contrary, it is determined that the execution was performed in a virtualized environment, then the boot process is aborted. The device 10 can for instance be shut down, i.e., no data, key, software, etc. is handed out to the computer 101.
   Intermediate situations can be contemplated, which may lead to loading a restrained version of the OS (not all components are allowed), or a modified version of the OS, where patches/programs are loaded to clean the computer 101.

The code mapping can be performed before or after testing the virtualized environment. No reboot is necessary. For example, the order in which to execute the virtualization check and to compute a hardware fingerprint does not matter. However, both data items (virtualization data and hardware fingerprint) are advantageously computed and checked in a database. This way both the virtualization and hardware fingerprint need to match a white list. In addition, the virtualization and hardware fingerprint may be correlatively tested, rather than independently. For example, one may obtain virtualization data that in itself is acceptable, paired with an acceptable hardware fingerprint in itself, yet forming a combination that is not identified as correct, i.e., the virtualization data does not match the correct hardware profile. For instance, if the hardware fingerprint identifies a PC with a fast computer but the virtualization data produces a timestamp of a slow computer this can be identified by combining the two and checking a resulting combination, e.g., in a same database.

For instance, combining the two approaches described in section 2.1 and 2.2, the present invention could be embodied as user trusted device or correspondingly a method for enabling a computer 101 to boot from a user trusted device 10. Essentially, the user trusted device 10 again comprises a connection interface 12 enabling connection S2 with said computer 101, and the method comprises:

1. enabling computer 101 to start booting from the device 10 upon connection of the device 10 with said computer 101 via said connection interface 12;
2. mapping firmware data to a mapping code, the firmware data comprising program code of an initialization firmware and/or data accessible by the initialization firmware 122 of the computer while starting to boot;
3. attesting trustworthiness of the mapping code;
4. instructing a processor 105 of the computer 101 to
   a. execute virtualization sensitive code and
   b. issue completion data upon completion of execution, which completion data depends on the virtualization sensitive code and its execution by the processor 105;
5. determining, based on said completion data, whether the execution was not performed in a virtualized environment; and
6. enabling said computer 101 to complete booting from the user trusted device 10, if it is determined that
   a. the execution was not performed in a virtualized environment; and
   b. if the mapping code is attested; or
   c. if the virtualization metrics, the mapping code is correct, as well as the virtualization metrics correlatively with (with respect to) the mapping code.

Notes that steps 2-3 can, in variants, be performed after, parallel to or interlaced with steps 4-5.

As noted earlier, no reboot is necessary between steps 2 and 4 above. As a final comment though, it is noted that the computer mostly needs be (re-)started after connecting the device 10 thereto, or otherwise put into a state that allows it to start from the external device 10 (to perform step 1 above, i.e., to start booting), e.g., the following options are therefore possible:

Computer 101 is shut-off; plug device 10; start computer; or

Computer 101 already running; plug device; restart computer.

2.3 Examples of Instructions Used in Embodiments

Examples of (sequences of) instructions that could advantageously be used for implementing embodiments of the invention follow. The person skilled in the art shall appreciate that other instructions with the same/similar functionality exist that can be used to achieve essentially the same.

To start with, an example of an API follows that allows for reading BIOS information ("firmware configuration data"):

outb(cmos_data_address, 0x70);
data_at_address=inb(0x71);

where cmos_data_address is iterated over the range 0 . . . max_cmos_data_address. Other similar instructions for reading the firmware's program code itself and/or the firmware configuration are provided by the Intel 82802AB/82802AC Firmware Hub (FWH).

In the EFI BIOS, the same instructions could be used to obtain the BIOS information, especially if e.g., the Intel Firmware Hub is used.

Next, an example of instructions is given that allows for interacting with the user trusted device from the PC:

Read a block from user trusted device (mass storage device)

mov ah, 42h
mov dl, the_drive_to_read_from
mov ds:si, disk_address_packet_describing_what_to_read
int 13h Write a block to user trusted device (mass storage device)

mov ah, 43h
mov dl, the_drive_to_write_to
mov ds:si, disk_address_packet_describing_what_to_write
int 13h In the EFI BIOS, the so-called EFI_DISK_IO_PROTOCOL or EFI_BLOCK_IO_PROTOCOL could be used, which both provide Read and Write functions.

Suitable disk I/O commands are easily accessible for the one skilled in the art.

Finally, an example of a sequence of instructions that can be used by the modules to initialize a PXE BIOS include but are not limited to:

Load UNDI ROM
PXENV_START_UNDI
PXENV_UNDI_STARTUP
PXENV_UNDI_INITIALIZE
PXENV_UNDI_OPEN An additional instruction (e.g., PXENV_UNDI_TRANSMIT) could be appended to send packets to the server 30, via the network card 124. By way of such instructions, the modules interact, upon execution at the host, with the PXE BIOS 122 to initialize the network card 124, whereby a communication can be initiated over the network.

Similar instructions are provided by EFI and UEFI BIOSes in the EFI_SIMPLE_NETWORK API (Initialize, Start, Stop, Receive, Transmit). BIOSes may also provide higher level protocol implementations of the TCP/IP stack and other networking protocols which may be used as well.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the secure device could be powered with solar cells or any other suitable batteries, etc. As touched earlier, the computerized methods described herein have been categorized according to their main functions: enabling computer 101 to (i) start and (ii) complete booting from the external device 10; mapping firmware data to a code; and attesting trustworthiness of the code. These main functions have been mostly described as being assigned to respective modules 15-17, for the sake of clarity of the description. However, embodiments of the present invention could be equivalently described with the same functions distributed over one or more modules, each provided with different ones of these functions.

REFERENCE LIST

10 User Trusted Device
11 Secure Device's CPU
12 Connection Interface
14 Persistent Memory
15, 16, 17 Computerized Modules
15 Data Mapping Module
16 Bootloader/Boot Enabling Data Structure
17 Verification Module
30 Server
100 General Computerized System
101 Host Computer
105 Processor
110 Memory
111 Operating System (OS)
115 Memory Controller
122 Initialization Firmware (BIOS) of Host Computer
124 Network Card
125 Display Controller
130 Display
141 Secure Memory
142 Non-Secure Memory
145 I/O Devices (or Peripherals)
150 Keyboard
151 First Part of Data Mapping Module
152 Second Part of Data Mapping Module
155 Mouse
165 Network

The invention claimed is:

1. A user trusted device, comprising:
a connection interface enabling connection with a computer; and
a persistent memory storing modules, which are configured, upon connection of the user trusted device with said computer via said connection interface, to:
enable said computer to start booting from the user trusted device;
map firmware data to a corresponding mapping code, the firmware data comprising program code of an initialization firmware stored in the computer while starting to boot;
attest trustworthiness of the mapping code, a stored verification module configured to instruct, upon execution, a checking of the mapping code against a list of mapping codes attesting good states of the initialization firmware,
wherein the list of mapping codes is stored in an external entity connected with the device through a communication network, and wherein the mapping code is obtained by mapping the firmware data; and
enable said computer to complete booting from the user trusted device if the mapping code is attested.

2. The user trusted device of claim 1, wherein said modules comprise:
a bootloader enabling said computer to start booting from the device;
a data mapping module, executable at the computer to map said firmware data; and
wherein,
the bootloader is detectable by the initialization firmware upon connection of the user trusted device with said computer and comprises instructions for the firmware to initiate a transfer of said data mapping module onto the computer for subsequent execution at the computer.

3. The user trusted device of claim 2, wherein
the data mapping module is further configured, upon execution at the computer, to transfer said mapping code to the verification module after mapping;
the verification module is executable at the device or the computer and configured, upon execution, to attest trustworthiness of the mapping code transferred by the data mapping module; and
the bootloader is further configured to interact with the firmware to complete booting from the user trusted device upon receiving confirmation that the mapping code is attested from the verification module.

4. The user trusted device of claim 2, wherein the verification module is configured to instruct, upon execution, to attest trustworthiness of the mapping code by checking it against a list of mapping codes attesting good states of the initialization firmware,
wherein the list of mapping codes is stored on the device.

5. The user trusted device of claim 2, wherein the verification module is further configured to instruct to connect to a server, via said computer, for checking the mapping code at least partly at the server.

6. The user trusted device of claim 5, wherein the verification module is further configured to interact with said firmware of the computer to subsequently interact with a network card of the computer, in order to initiate a communication over the network as enabled by said network card, to connect to the server.

7. The user trusted device of claim 5, wherein the verification module is further configured to access network card drivers stored on the user trusted device to directly interact with a network card of the computer, in order to initiate a communication over the network as enabled by said network card to connect to the server.

8. The user trusted device of claim 5, wherein the verification module is further configured to:
interact, via the bootloader, with the firmware to partly run an operating system of the computer, as necessary to instruct to connect to the server via said computer; and
complete booting from the user trusted device if the mapping code is attested.

9. A method for enabling a computer to boot from a user trusted device, the user trusted device comprising a connection interface enabling connection with said computer, the method comprising:
enabling said computer to start booting from the user trusted device upon connection of the user trusted device with said computer via said connection interface;
mapping firmware data to a corresponding mapping code, the firmware data comprising program code of an initialization firmware stored in the computer while starting to boot;
attesting trustworthiness of the mapping code;
instructing, upon execution, a checking of the mapping code against a list of mapping codes attesting good states of the initialization firmware,
wherein the list of mapping codes is stored in an external entity connected with the device through a communication network, and wherein the mapping code is obtained by mapping the firmware data; and
enabling said computer to complete booting from the user trusted device if the mapping code is attested.

10. The method of claim 9, further comprising interacting with an initialization firmware of the computer, upon connection of the user trusted device with said computer, to
- enable said computer to start booting from the user trusted device; and
- initiate a transfer of a data mapping module onto the computer for subsequent execution at the computer, to map said firmware data to said mapping code.

11. The method of claim 9, wherein attesting trustworthiness of the mapping code comprises
- instructing to attest trustworthiness of the mapping code by checking it against a list of mapping codes attesting good states of the initialization firmware, which the list of mapping codes is accessed from a server.

12. The method of claim 9, wherein attesting trustworthiness of the mapping code comprises
- connecting to a server via said computer for checking the mapping code at least partly at the server.

13. The method of claim 12, wherein connecting to a server further comprises:
- interacting with said firmware of the computer to subsequently interact with a network card of the computer, in order to initiate a communication over the network as enabled by said network card, to connect to the server.

14. The user trusted device of claim 12, wherein connecting to a server further comprises either:
- accessing network card drivers stored on the user trusted device to directly interact with a network card of the computer, in order to initiate a communication over the network as enabled by said network card, to connect to the server; or
- interacting with the initialization firmware to start booting an operating system of the computer, to initiate a communication over the network through the operating system and thereby connect to the server, and to complete booting from the user trusted device if the mapping code is attested.

15. A computer program product for enabling a computer to boot from a user trusted device, the computer program product comprising a non-transitory computer-readable storage medium having modules embodied therewith, the modules allowing for enabling the computer to boot from the user trusted device, the user trusted device comprising a connection interface enabling connection with said computer, a method comprising: enabling said computer to start booting from the user trusted device upon connection of the user trusted device with said computer via said connection interface; mapping firmware data to a corresponding mapping code, the firmware data comprising
- program code of an initialization firmware stored in the computer while starting to boot;
- attesting trustworthiness of the mapping code; instructing, upon execution, a checking of the mapping code against a list of mapping codes attesting good states of the initialization firmware, wherein the list of mapping codes is stored in an external entity connected with the device through a communication network, and wherein the mapping code is obtained by mapping the firmware data; and enabling said computer to complete booting from the user trusted device if the mapping code is attested.

16. The user trusted device of claim 2, wherein the device is further connected to an external entity to check whether the mapping code is a valid code.

* * * * *